(12) United States Patent   (10) Patent No.: US 9,387,906 B2
Rasmussen   (45) Date of Patent: Jul. 12, 2016

(54) BATTERY BOX FOR ELECTRIC CYCLE

(71) Applicant: Ford Global Technologies, LLC, Dearborn, MI (US)

(72) Inventor: Mitchell Jeff Rasmussen, Coburg (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/482,028

(22) Filed: Sep. 10, 2014

(65) Prior Publication Data

US 2016/0068224 A1   Mar. 10, 2016

(51) Int. Cl.
*B62M 6/40* (2010.01)
*B62M 6/90* (2010.01)
*H01M 10/613* (2014.01)
*H01M 10/625* (2014.01)
*H01M 10/6551* (2014.01)
*B62M 6/45* (2010.01)
*H01M 2/10* (2006.01)

(52) U.S. Cl.
CPC . *B62M 6/90* (2013.01); *B62M 6/45* (2013.01); *H01M 2/1083* (2013.01); *H01M 10/613* (2015.04); *H01M 10/625* (2015.04); *H01M 10/6551* (2015.04)

(58) Field of Classification Search
CPC ..... B62M 6/90; H01M 10/613; H01M 10/625
USPC ........................................................ 180/220
See application file for complete search history.

(56) References Cited

U.S. PATENT DOCUMENTS

| 4,126,734 | A | * | 11/1978 | Walters | H01M 2/1072 123/142.5 R |
| 5,278,002 | A | * | 1/1994 | Hiers | H01M 2/1094 429/120 |
| 5,390,754 | A | * | 2/1995 | Masuyama | H01M 2/1083 105/51 |
| 6,095,270 | A | * | 8/2000 | Ishikawa | B62H 5/00 180/220 |
| 6,189,635 | B1 | * | 2/2001 | Schuler | B60R 16/04 180/65.1 |

(Continued)

FOREIGN PATENT DOCUMENTS

| CN | 2825435 Y | 10/2006 |
| CN | 101962050 A | 2/2011 |

(Continued)

OTHER PUBLICATIONS

GB Search Report dated Mar. 8, 2016 (4 pages).

*Primary Examiner* — Anne Marie Boehler
*Assistant Examiner* — Marlon A Arce
(74) *Attorney, Agent, or Firm* — Frank A. MacKenzie; Bejin Bieneman PLC

(57) ABSTRACT

A battery box for an electric cycle includes a battery and a case enclosing the battery. The case includes an air inlet and an air outlet in communication with the air inlet for directing air flow through the case to cool the battery. An adjustable vent is disposed at the air outlet for deflecting the air flow from the air outlet in a selected direction, such as toward an occupant of the electric cycle.

18 Claims, 9 Drawing Sheets

(56) References Cited

U.S. PATENT DOCUMENTS

| | | | | |
|---|---|---|---|---|
| 6,931,884 B2* | 8/2005 | Kolda | .................. | B60H 1/3232 |
| | | | | 62/239 |
| 6,979,013 B2 | 12/2005 | Chen | | |
| 7,126,311 B2* | 10/2006 | Gottsponer | ......... | H01M 2/1027 |
| | | | | 320/110 |
| 7,931,110 B2* | 4/2011 | Nishiura | ................ | B60L 11/18 |
| | | | | 180/218 |
| 8,002,067 B2* | 8/2011 | Nishiura | .............. | B62K 25/283 |
| | | | | 180/218 |
| 2006/0078786 A1* | 4/2006 | Wu | ..................... | H01M 2/1022 |
| | | | | 429/62 |
| 2007/0108946 A1* | 5/2007 | Yamauchi | ............ | H01M 10/42 |
| | | | | 320/132 |
| 2010/0053898 A1* | 3/2010 | Isomoto | ............. | H05K 7/20918 |
| | | | | 361/697 |
| 2011/0111272 A1* | 5/2011 | Yang | .................... | B60L 3/0046 |
| | | | | 429/62 |
| 2011/0226441 A1* | 9/2011 | Yamatani | ........... | B60H 1/00278 |
| | | | | 165/47 |
| 2012/0080252 A1* | 4/2012 | Nishimori | ................ | B62M 6/65 |
| | | | | 180/65.51 |
| 2012/0145852 A1* | 6/2012 | Chiang | .................... | B62M 6/90 |
| | | | | 248/224.8 |
| 2015/0140375 A1 | 5/2015 | Lee et al. | | |

FOREIGN PATENT DOCUMENTS

| | | | |
|---|---|---|---|
| CN | 102442385 | A | 5/2012 |
| CN | 2012104501 | A | 5/2012 |
| CN | 20120129419 | A | 11/2012 |
| CN | 202957310 | U | 5/2013 |
| CN | 103474597 | A | 12/2013 |
| EP | 2176117 | B1 | 3/2011 |
| JP | 200294301 | A | 10/2000 |
| WO | 2008122985 | A1 | 10/2008 |
| WO | 2015063555 | A1 | 5/2015 |

* cited by examiner

BATTERY BOX FOR ELECTRIC CYCLE

BACKGROUND

Electric cycles, such as bicycles, tricycles, recumbent trikes, unicycles, etc., include a frame and one or more wheels rotatably mounted to the frame. An electric motor is coupled to the wheel for powering the wheel and a battery is connected to the electric motor for powering the electric motor. The electric cycle may propelled solely by the electric motor or may be propelled by a combination of electric power and manual pedaling.

Occupants who drive electric cycles may become cold while travelling on the electric cycle. Wind blowing against the occupant while traveling, for example, may chill the occupant. This may be particularly common when the occupant wears light clothing in mild outdoor air temperatures. Such mild outdoor air temperatures may feel relatively cold to the occupant at speeds associated with travelling on the electric cycle. As another example, the occupant may travel to a professional office on the electric cycle, in which case the occupant may wear business clothing, e.g., a female occupant may wear a skirt, a male occupant may wear thin slacks, etc., that may not be sufficient to keep the occupant warm during travel on the electric cycle.

The electric cycle may include panels, a cabin, etc., for blocking the wind while travelling on the electric cycle. However, such features are not sufficient to warm the occupant, especially when the outdoor air temperature is cold.

As such, an opportunity remains to selectively provide heat to an occupant of the electric cycle.

DETAILED DESCRIPTION

Figure 1:
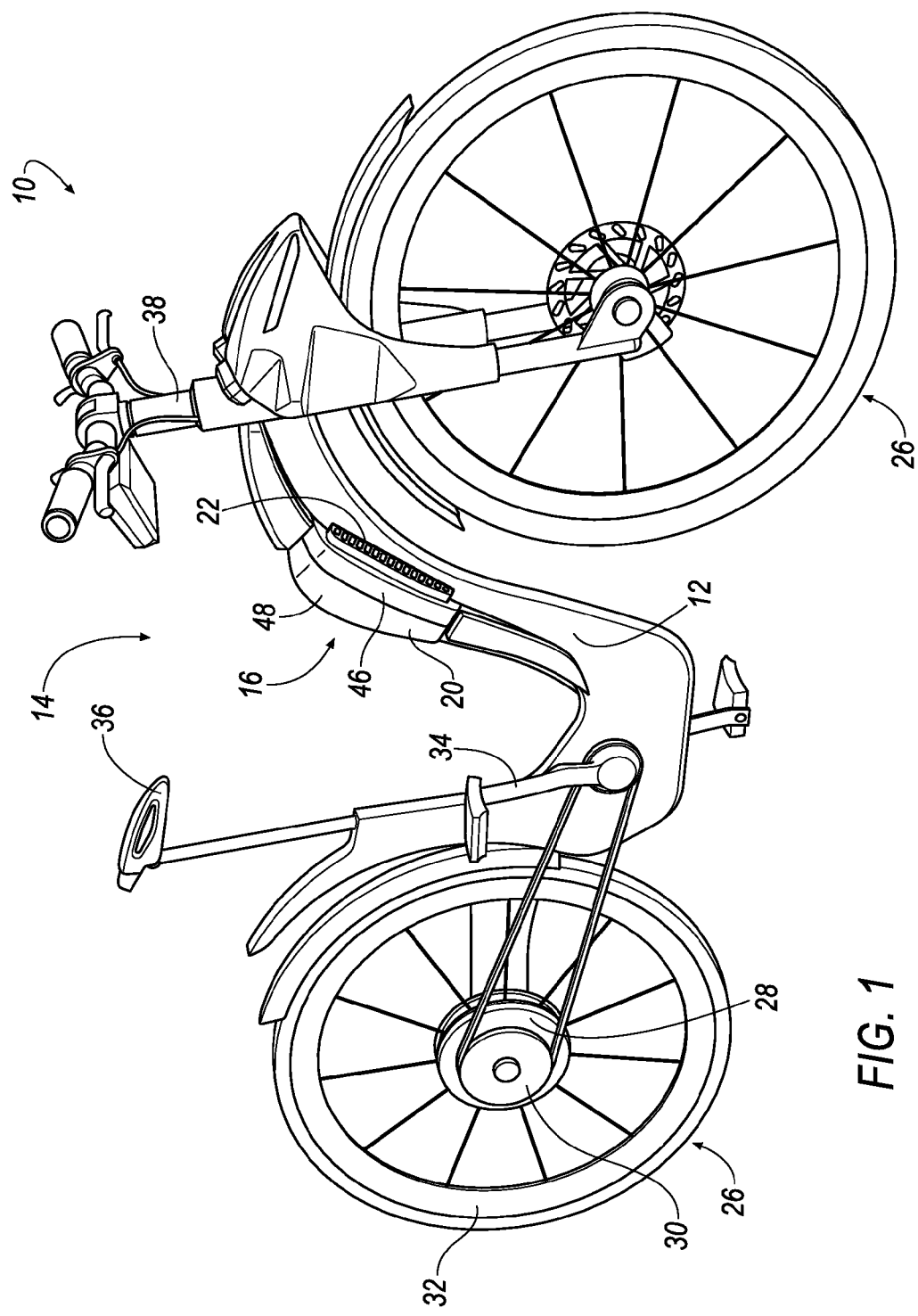
FIG. 1 is a perspective view of an electric cycle.

With reference to the Figures, wherein like numerals indicate like parts throughout the several views, an electric cycle 10 comprises a frame 12 defining an occupant region 14 configured to be occupied by an occupant (not shown). A battery box 16 is supported by the frame 12 and includes a battery 18 and a case 20 enclosing the battery 18. The case 20 includes an air inlet 22 and an air outlet 24. The air outlet 24 is in communication with the air inlet 22 and faces the occupant region 14 for allowing air flow from inside the case 20 toward the occupant region 14.

Figure 3:
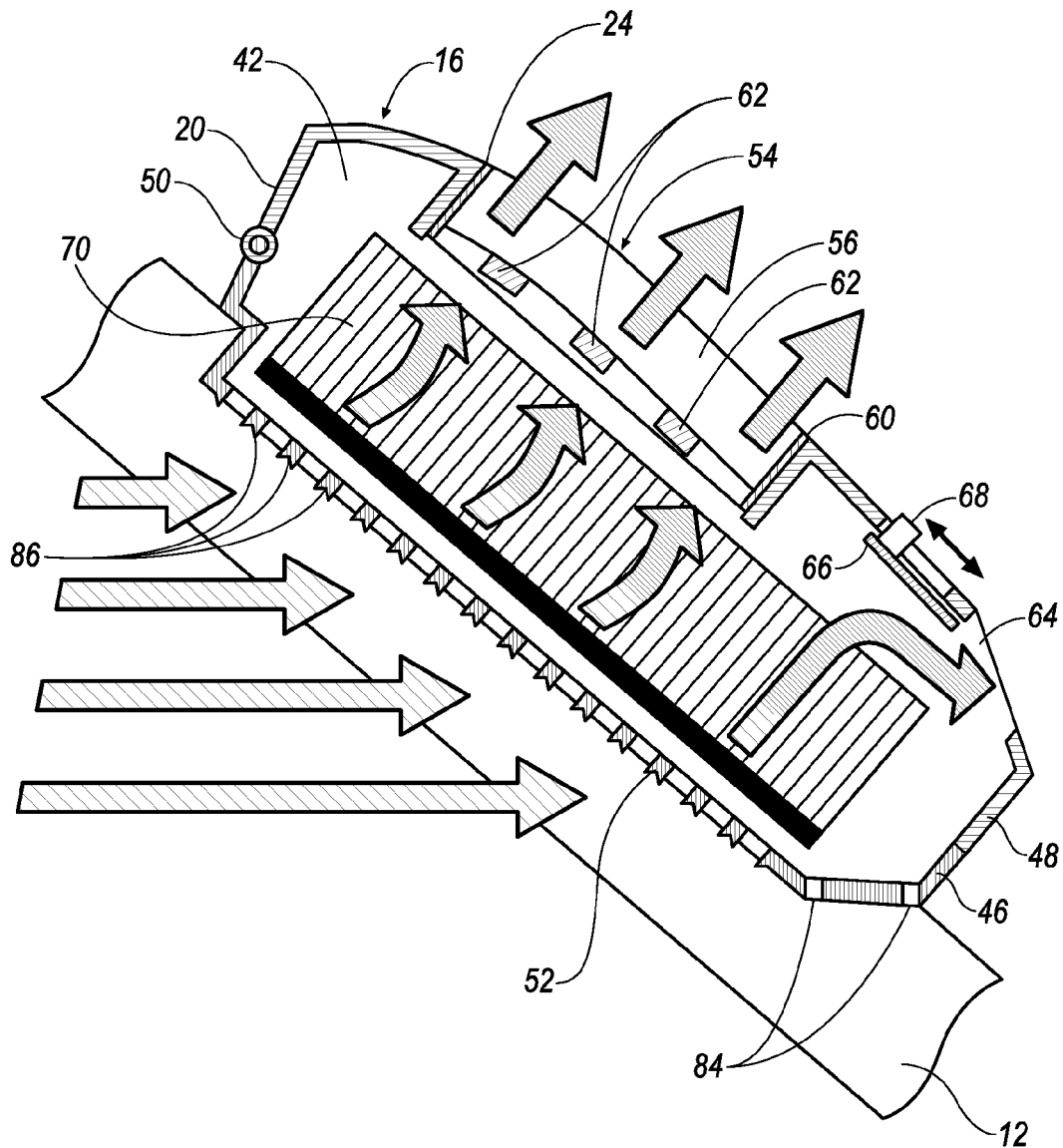
FIG. 3 is a cross-sectional view of the battery box having a case enclosing contents of the battery box.

The battery 18 generates heat during operation and the battery 18 and/or other components in the case 20 may be sensitive to heat and may be damaged when heated to sufficient temperatures. With reference to FIG. 3, the air outlet 24 is in communication with the air inlet 22 for directing air flow (generally shown for example with arrows in FIG. 3) through the case 20 to cool the battery 18. As such, the air flow inside the case 20 from the air inlet 22 to the air outlet 24 removes heat from the case 20 to cool the air in the case 20, which cools the battery 18 and/or other components in the case 20. Specifically, the air flow is forced into the air inlet 22 as the electric cycle 10 is propelled forwardly.

With continued reference to FIG. 3, the air flow from the air inlet 22 to the air outlet 24 is heated from the heat generated by the battery 18. Since the air outlet 24 faces the occupant region 14, this heated air flow exiting the air outlet 24 is directed toward an occupant in the occupant region 14. As such, the heated air flow may be used to warm the occupant. Since this heated air flow is a by-product of cooling the battery 18, this heated air flow that may be used to warm the occupant is generated at no additional cost and/or energy consumption.

The electric cycle 10 may be of any suitable type. For example, the electric cycle 10 may be a bicycle, tricycle, recumbent trike, unicycle, etc. The electric cycle 10 includes one or more wheels 26 rotatably mounted to the frame 12. For example, the electric cycle 10 shown in the Figures is a bicycle including two wheels 26.

With reference to FIG. 1, an electric motor 28 is coupled to at least one of the wheels 26 for powering the wheel 26. The electric motor 28 may be supported on the wheel 26, as shown in the Figures. Alternatively, the electric motor 28 may be supported on a frame 12 of the electric cycle 10. The electric motor 28 is connected, e.g., by wiring or in any other suitable fashion, to the battery 18 for powering the electric motor 28. The electric motor 28 may be of any suitable type.

The wheel 26 may, for example, include a hub 30 coupled to the frame 12 and a rim 32 rotatably coupled to the hub 30. A tire, e.g., inflatable with air, may be mounted to the rim 32. The motor 28 may be disposed between the hub 30 and the rim 32 for rotating the hub 30 about the rim 32.

The electric cycle 10 may be propelled solely by the electric motor 28 or, alternatively, may be propelled by a combination of the electric motor 28 and manual pedaling. The electric cycle 10 may, for example, include pedals 34 connected to at least one of the wheels 26, e.g., through a belt and gear system, for manually pedaling to rotate the wheel 26.

With continued reference to FIG. 1, the frame 12 may be formed of tubular beams formed of, for example, steel, aluminum, titanium, carbon fiber, etc. Alternatively, the frame 12 may have any suitable configuration and may be formed of any suitable material. The frame 12 may support any suitable component such as a seat 36, handlebars 38, etc. The electric cycle 10 may include panels (not shown), a cabin (not shown), etc. supported on the frame 12 for protecting the occupant region 14 from wind during operation of the electric cycle 10.

As set forth above, the occupant region 14 is configured to be occupied by an occupant. In other words, the occupant region 14 is sized and shaped to receive the occupant while the electric cycle 10 is operated. The occupant region 14 may be sized and shaped to receive the occupant in a seated position such that the occupant may operate the electric cycle 10 from the seated position. In addition or in the alternative, the occupant region 14 may be sized and shaped such that the occupant may operate the electric cycle 10 from other positions (not shown) such as a standing position, a kneeling position, etc. The occupant region 14 may be sized and shaped to receive more than one occupant (not shown).

The occupant region 14 may be defined between the handlebars 38 and the seat 36, i.e., the space between the handlebars 38 and the seat 36 that may be occupied by the occupant. The occupant region 14 may be protected and/or enclosed (not shown) by the panels, cabin, etc. supported on the frame 12.

The battery 18 may be of any suitable type. For example, the battery 18 may be a lithium ion battery 18. The battery 18 may include any suitable number of cells arranged in any suitable number of banks 40. For example, the battery 18 shown in the Figures includes two banks 40 each including 22 cells. The battery 18 may be rechargeable by an external power source (not shown). For example, the case 20 may support a socket (not shown) in connection with the battery 18 for connecting the battery 18 to the external power source through a cord. In addition or in the alternative, the electric cycle 10 may recharge the battery 18 by regenerative braking.

Figure 4:
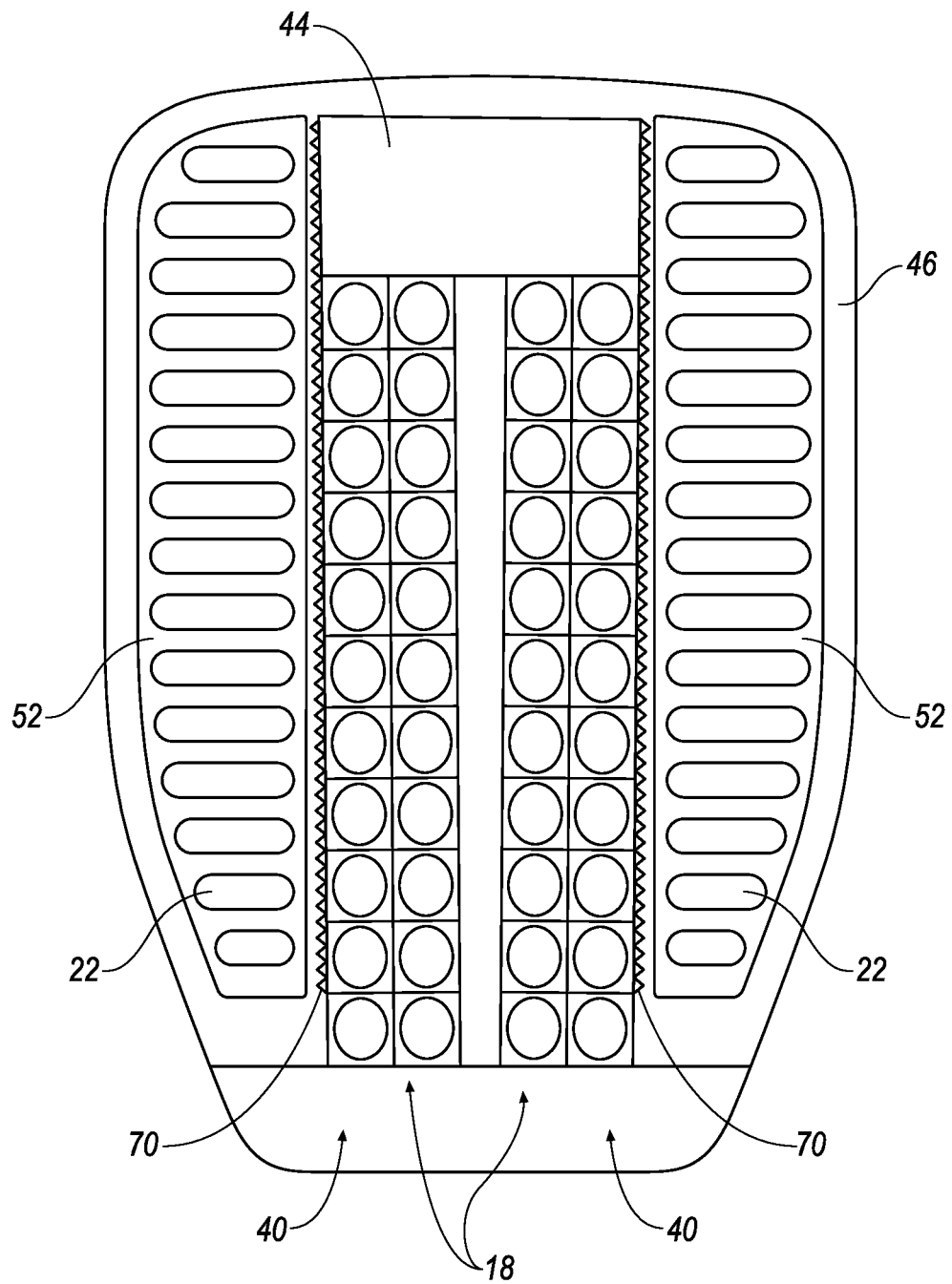
FIG. 4 is a plan view of a mounting segment of the case and contents of the battery box supported on the mounting segment.
Figure 5:
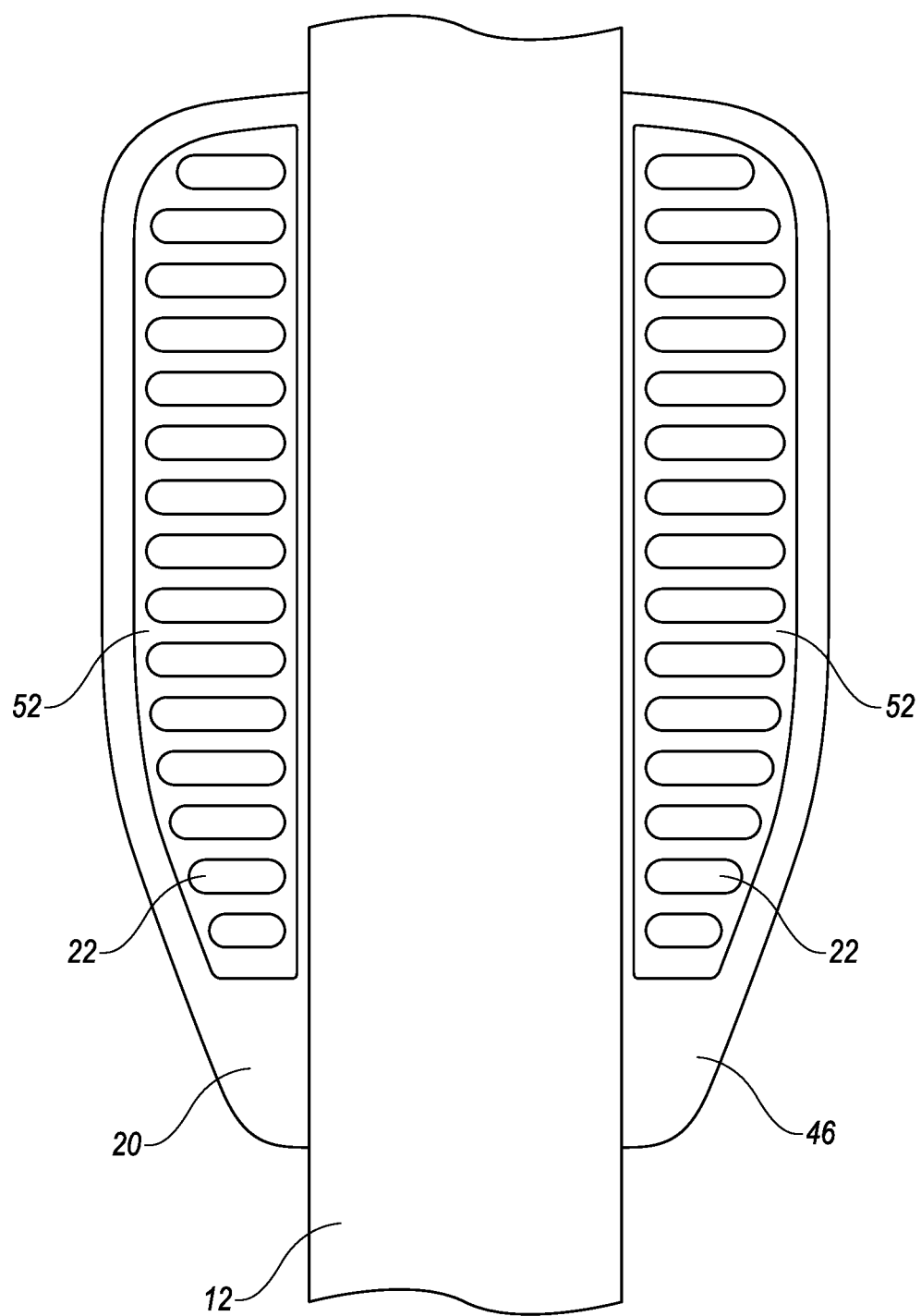
FIG. 5 is a front view of a portion of the electric cycle with the battery box mounted to the frame of the electric bicycle and with air inlets defined in the case about the frame.

With reference to FIGS. 3 and 4, the case 20 defines a cavity 42 that receives the battery 18. An air passage, i.e., a path through which air may flow, extends through the cavity 42 from the air inlet 22 to the air outlet 24.

A motor controller 44 for controlling the motor of the electric cycle 10 may be supported in the cavity 42. A power inverter (not numbered) may be connected to the motor controller 44. The air passage may extend across the motor controller 44 and/or the power inverter. A heat sink (not numbered) may be disposed on the motor controller 44 and/or the power inverter for promoting the transfer of heat from the motor controller 44 and/or the power inverter to the air flow.

Figure 7:
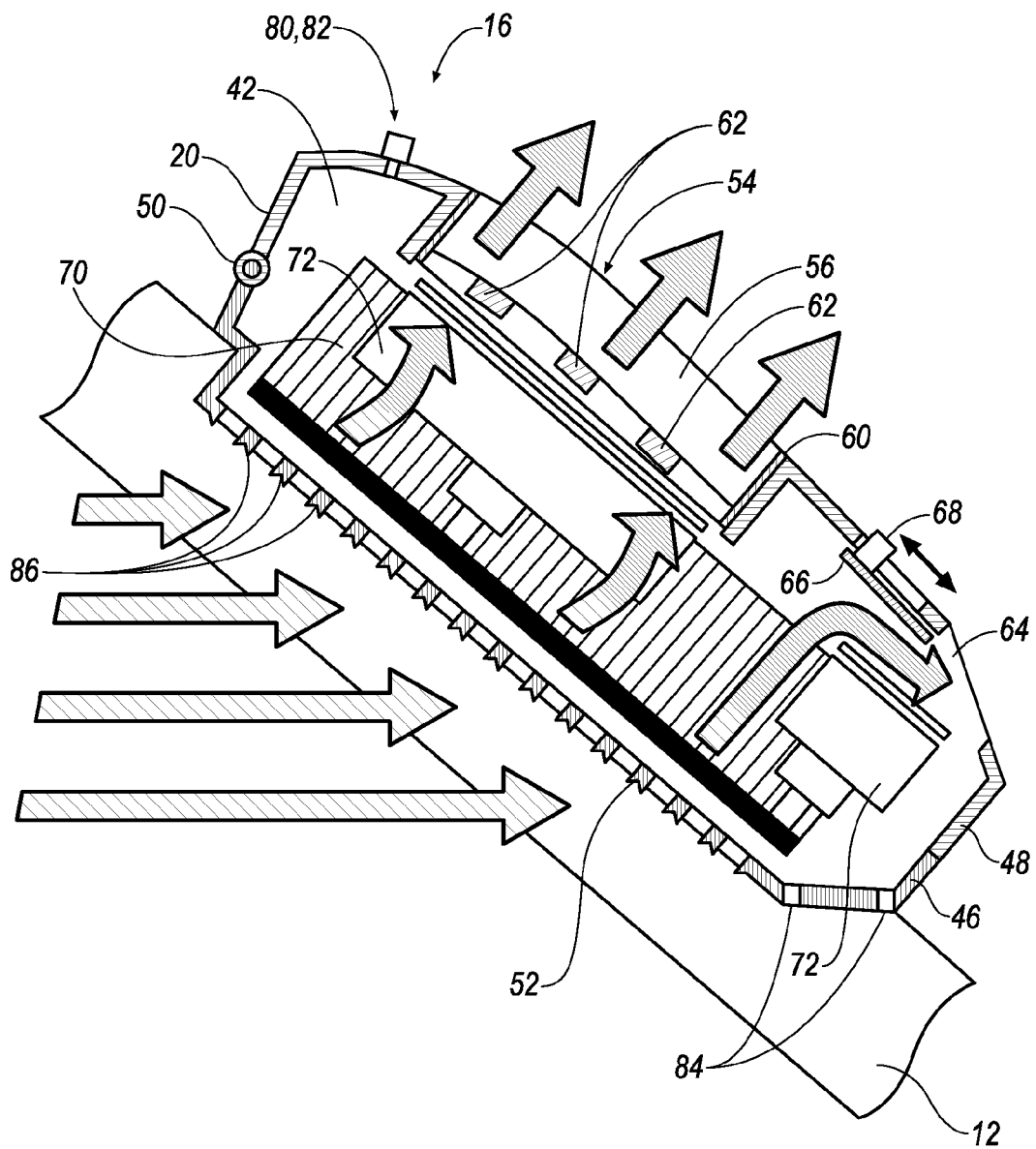
FIG. 7 is a cross-sectional view of a second embodiment of the battery box.

The case 20 is configured to protect contents of the case 20, e.g., the battery 18. For example, the case 20 may structurally protect the contents. The case 20 may include structural reinforcements (not shown), e.g., ribs. The case 20 may also seal some contents, e.g., sensitive electronics, inside the case 20 from water and moisture that may enter the case 20 through the air inlet 22. The case 20 may define one or more drainage holes 84 for draining water from the case 20, as shown in FIGS. 3 and 7.

The case 20 may be formed of plastic. Alternatively, the case 20 may be formed of any suitable material for protecting contents of the case 20. The case 20 may support any suitable features such as, jacks, plugs, USB plugs, ports, and any outer suitable hardware.

With reference to FIG. 3, the case 20 may include a mounting segment 46 for mounting to the frame 12 and a cover 48 removably connected to the mounting segment 46 for accessing the contents of the case 20. The cavity 42 is defined between the mounting segment 46 and the cover 48. The cover 48 may be connected to the mounting segment 46 in any suitable fashion, e.g. the hinge 50 as best shown in FIG. 3. When the cover 48 is in a closed position relative to the mounting segment 46, as shown in FIGS. 1-3 and 4-5, the cover 48 may lock to the mounting segment 46 in any suitable manner, e.g., with clips, snaps, clasps, etc.

Figure 2:
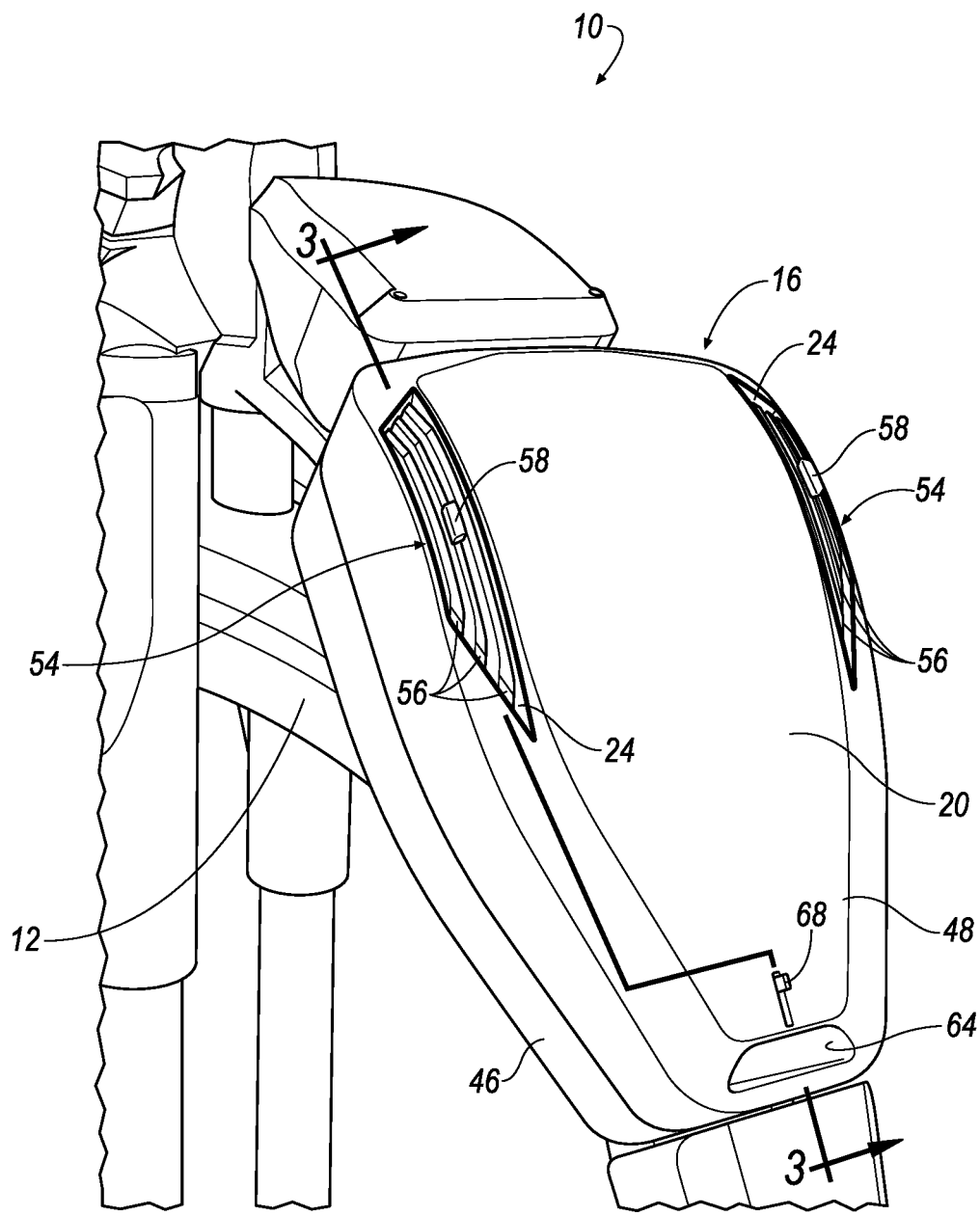
FIG. 2 is a magnified view of a portion of the electric cycle including a battery box mounted to a frame of the electric cycle.

With reference to FIGS. 1-3 and 5, the case 20 of the mounting segment 46 is mounted to the frame 12 of the electric cycle 10. Specifically, the case 20 is configured to be mounted to the frame 12 of an electric cycle 10. For example, the case 20 is sized and shaped to extend about the frame 12, as shown in FIGS. 1 and 2. The mounting segment 46 may be fixed to the frame 12 in any suitable fashion. For example, the mounting segment 46 may be fastened to the frame 12 with fasteners (not shown). The mounting segment 46 may include an anti-theft feature.

As set forth above, the air passage extends from the air inlet 22 to the air outlet 24 and air flow. With reference to FIGS. 1 and 3-5, the air inlet 22 faces away from the occupant region 14 for intaking air as the electric cycle 10 moves forward. In other words, the air inlet 22 faces forwardly so that the air flow is forced into the air inlet 22 as the electric cycle 10 is propelled forwardly. The battery box 16 may define any suitable number of air inlets 22. For example, the battery box 16 shown in the Figures includes two air inlets 22.

The air inlet 22, for example, is covered by a grate 52 for preventing debris from entering the air inlet 22. The grate 52 may be configured to disrupt water that may enter the air inlet 22 into smaller water droplets. The grate 52 may define protrusions 86 for directing water away from the air inlet 22, as shown in FIGS. 3 and 7. The case may include baffles (not shown) adjacent the air inlet 22 for deflecting water that enters the case 20 through the air inlet 22.

As shown in FIGS. 3 and 7, the air flow changes direction from the air inlet 22 to the air outlet 24. Due to this change in direction, any water that may have entered through the air inlet 22 is separated from the air and falls downwardly by gravity. This water may be drained through the drainage holes 84. As shown in FIGS. 3 and 7, the air inlet 22 slopes downwardly, which may aid in preventing rain or splashed water into the air inlet 22.

With reference to FIG. 1, the frame 12 extends rearwardly from the battery box 16 toward the occupant region 14. Specifically, the frame 12 extends downwardly and rearwardly from the battery box 16 to the pedals 34 and upwardly from the pedals 34 to the seat 36. As set forth above, the occupant region 14 is defined between the battery box 16 and the seat 36.

Figure 6:
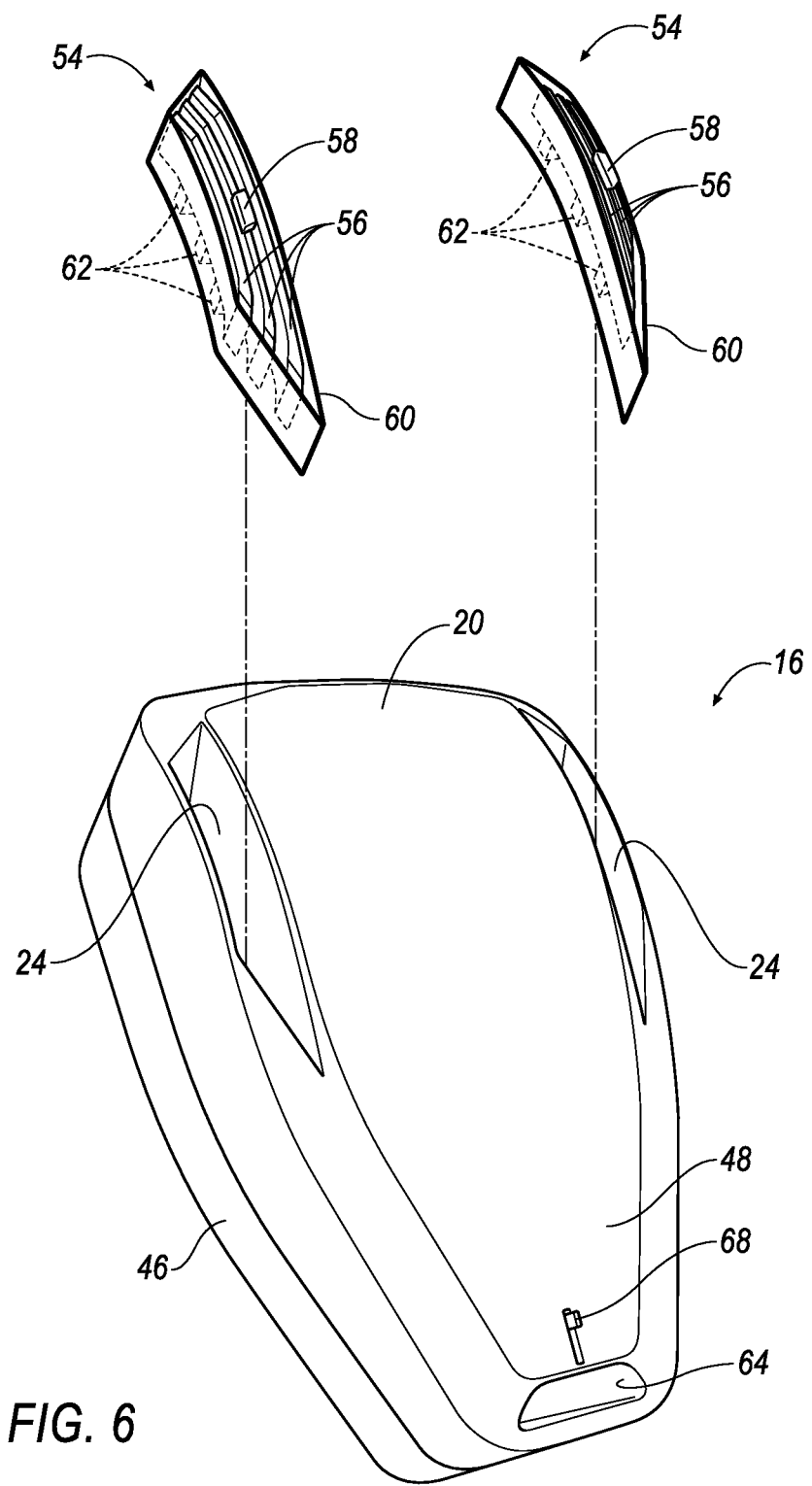
FIG. 6 is a perspective view of the battery box with vents exploded away from the casing.

At least one adjustable vent 54 is disposed at the air outlet 24 for deflecting the air flow from the air outlet 24 in a selected direction. Specifically, as shown in FIGS. 2 and 6, the battery box 16 includes two adjustable vents 54.

The adjustable vent 54 is adjustable in at least one direction. For example, the adjustable vent 54 may include at least one vane 56 for directing the air flow. Specifically, with reference to FIG. 6, the adjustable vent 54 may include a plurality of vanes 56 connected to each other to simultaneously move together as a unit. A finger-grip 58 may be disposed on one of the vanes for adjusting the vanes.

The adjustable vent 54 may include a frame 60 mounted to the case 20 and supporting the one or more vanes 56. For example, one or more vanes 56 may be pivotally connected to the frame 60 for directing the air flow and may simultaneously move together as a unit relative to the frame 60. Specifically, with reference to FIG. 6, the adjustable vent 54 includes a plurality of vanes 56 connected to the frame 60 and connected to each other to simultaneously move together as a unit relative to the frame 12. The frame 60 may be fixed to the case 20 or may be moveably coupled to the case 20, e.g., pivotable, to add another degree of freedom to the adjustment of the air flow from the air outlet 24.

The adjustable vent 54 may include at least on other vane 62 transverse to the at least one vane 56. For example, the adjustable vent 54 may include a plurality of vanes 62 pivotally connected to the frame 12 transverse to the vanes 56. The vanes 56 and the vanes 62 may be independently adjustable. As such, the vanes 56 and the vanes 62 provide for adjustment of the air flow in two directions. The finger-grip 58 may be coupled to both the vanes 56 and the vanes 62 for adjusting the vanes 56 and the vanes 62.

The battery box 16 may include an additional air outlet 64 in communication with the air inlet 22 and facing the occupant region 14. The air outlet 64 may be selectively opened and closed. For example, as shown in FIG. 3, a baffle 66 may be in communication with the air outlet 24 for opening and closing the air outlet 24. As shown in FIGS. 2 and 3, the baffle 66 may be connected to a slide switch 68 slideably supported by the case 20 for moving the baffle 66 between opened and closed positions. Alternatively, the air outlet 64 may be opened and closed in any suitable fashion. In addition to or in the alternative to the baffle 66, one or more vanes (not shown) may be supported by the casing at the air outlet 24 for directing the air flow exiting the air outlet 24.

With reference to FIG. 3, the air flow extends along the battery 18 to transfer heat from the battery 18, and the air surrounding the battery 18, to the air flow to cool the battery 18. The arrows indicating air flow in FIG. 3 include shading changes to indicate heating of the airflow from the air inlet 22 to the air outlet 24. This heated air flow may be exited from the casing through the air outlet 24s.

With reference to FIGS. 3 and 4, a heat sink 70 may be in communication with the battery 18 for removing heat from the battery 18. The air passage may extend across the heat sink 70 for aiding in the transfer of heat from the battery 18 to the air flow. The heat sink 70 may have any suitable configuration to promote heat transfer.

In operation, as the electric cycle 10 is propelled forwardly, air is forced into the air inlet 22 to cause air flow across the battery 18 and/or the motor controller 44 as shown in FIG. 3. This air flow cools the battery 18 and/or the motor controller 44 and, as a result, the air flow is heated. The occupant of the electric cycle 10 may direct this heated air flow toward the occupant or away from the occupant using the vents 54. The occupant may also selectively open and close the additional air outlet 64 to change the direction and amount of heated air flow directed toward the occupant.

Figure 8:
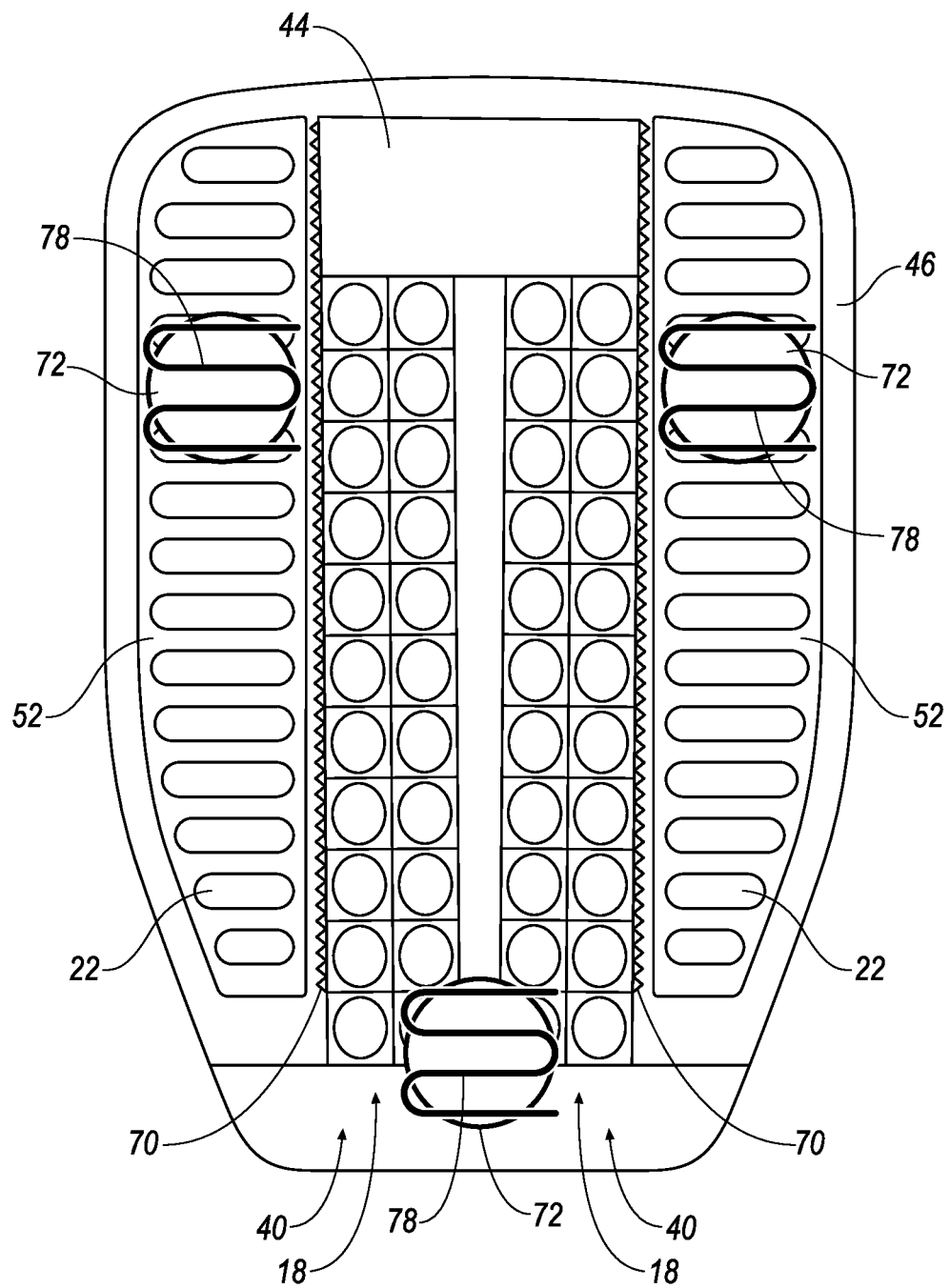
FIG. 8 is a plan view of a portion of the battery box of FIG. 7.
Figure 9:
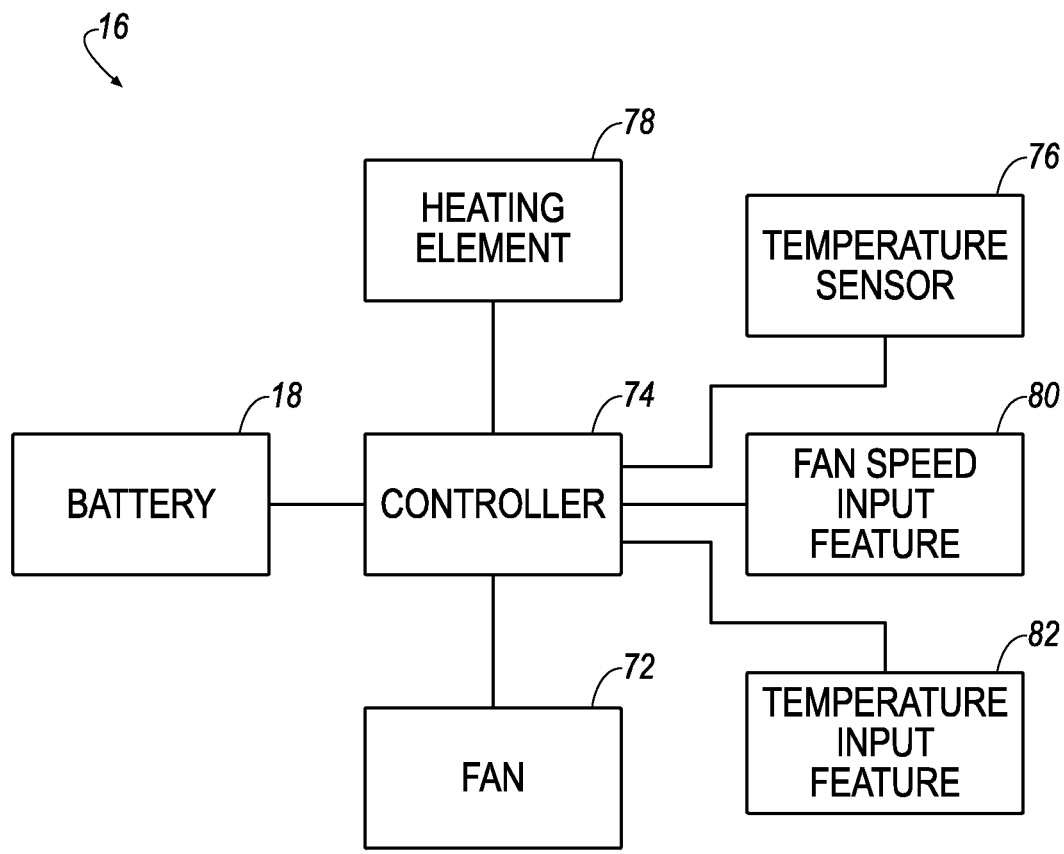
FIG. 9 is a schematic of the battery box of FIG. 7.

With reference to FIGS. 7-9, the battery box 16 may include a fan 72 disposed in the case 20 for forcing the air flow from the air inlet 22 to the air outlet 24. For example, as shown in FIG. 8, the battery box 16 may include more than one fan 72. For example, each fan 72 may be disposed adjacent one air outlet 24 for forcing air through the air outlet 24. The fan 72 may be of any suitable type and in any suitable location for drawing air flow through the air inlets 22 and/or forcing air flow from the cavity 42 through the air outlets 24.

With reference to FIG. 9, the battery box 16 may include a controller 74 in communication with one or more of the fans 72 for controlling the fans 72. The controller 74 may be in communication with the battery 18 for controlling power delivery from the battery 18 to the fans 72. The controller 74 may control the fan 72 by turning the fan 72 on/off and/or by controlling the speed of the fan 72.

The controller 74 may control the fan 72 based on any suitable criteria. For example, the controller 74 may control the power to the fan 72 based on temperature of air in the cavity 42 and/or based on desired output of air flow from the air outlet 24 toward the occupant region 14.

The battery box 16 may include a temperature sensor 76 disposed in the case 20 and in communication with the controller 74. The temperature sensor 76 senses the temperature of air in the cavity 42 and communicates the measurement to the controller 74. The controller 74 may be programmed to adjust one or more of the fans 72 based on the temperature measurement by the temperature sensor 76. For example, the controller 74 may be programmed to turn on and/or increase the speed of one or more fans 72 when the temperature sensor 76 senses a temperature that exceeds a maximum threshold, e.g., in order to cool the battery 18 and/or the motor controller 44 before damage. The temperature sensor 76 may be disposed in any suitable location within the case 20 and the battery box 16 may include any suitable number of temperature sensors 76.

With reference to FIGS. 7-9, the battery box 16 may include a heating element 78 disposed in the case 20 and in communication with the controller 74. The controller 74 may be programmed to supply power from the battery 18 to the heating element 78 to generate heat in the cavity 42 for heating the air flow that is subsequently directed toward the occupant region 14. In other words, the heating element 78 may be operated to generate heat in addition to the heat generated by the battery 18 and/or motor controller 44 to heat the air exiting the air outlets 24 to a desired temperature to warm the occupant. The heating element 78 may be of any suitable type, e.g., a coiled element heated by electric resistance.

With reference to FIGS. 7 and 9, the battery box 16 may include at least one input feature 80, 82 for controlling the temperature and/or velocity of air exiting the battery box 16 through the air outlets 24. For example, the battery box 16 may support a fan speed input feature 80 for adjusting the speed of the fan 72 and a temperature input feature 82 for adjusting the temperature of the air flow exiting the battery box 16. The fan speed input feature 80 and the temperature input feature 82 may be of any suitable type, e.g., a knob, dial, graphical user interface, etc.

The fan speed input feature 80 is in communication with the controller 74. The controller 74 may be programmed to adjust the speed of the fan 72 based on the fan speed input feature 80.

The temperature input feature 82 is in communication with the controller 74. As set forth above, a measurement of the temperature of the air in the case 20 is communicated from the temperature sensor 76 to the controller 74. The controller 74 may be programmed to control the power to the heating element 78 based on the temperature measurement from the temperature sensor 76 and the input from the temperature input feature 82 to the controller 74. For example, if the temperature of the air in the cavity 42 is too low to satisfy the occupant's desired setting on the temperature input feature 82, the controller 74 is programmed to supply power to the heating element 78 based on the setting of the temperature input feature 82. For example, the controller 74 may include or may be configured as a thermostat.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A battery box comprising:
   a battery;
   a case enclosing the battery and including an air inlet and an air outlet in communication with the air inlet for directing air flow through the case to cool the battery; and
   an adjustable vent disposed at the air outlet for deflecting the air flow from the air outlet in a selected direction;
   a fan disposed in the case for forcing air flow from the air inlet to the air outlet;
   a controller in communication with the fan and a temperature sensor in communication with the controller; and
   a heating element disposed in the case and in communication with the controller.

2. The battery box as set forth in claim 1 wherein the adjustable vent includes a frame and a vane pivotally connected to the frame for directing the air flow.

3. The battery box as set forth in claim 2 further comprising another vane pivotally connected to the frame transverse to the vane.

4. The battery box as set forth in claim 1 further comprising an additional air outlet defined by the case in communication with the air inlet, and a baffle in communication with the additional air outlet for opening and closing the additional air outlet.

5. The battery box as set forth in claim 1 wherein the case is configured to be mounted to the frame of an electric cycle.

6. The battery box as set forth in claim 1 further comprising a heat sink in communication with the battery and an air passage extending from the air inlet to the air outlet and extending across the heat sink.

7. The battery box as set forth in claim 1 further comprising a motor controller programmed to control a motor of an electric cycle.

8. The battery box as set forth in claim 1 wherein the controller is programmed to supply power from the battery to the heating element.

9. An electric cycle comprising:
a frame defining an occupant region configured to be occupied by an occupant;
a battery box supported by the frame and including a battery and a case enclosing the battery;
the case including an air inlet and an air outlet, the air outlet being in communication with the air inlet and facing the occupant region for allowing air flow from inside the case toward the occupant region; and
a controller in communication with the fan, a temperature sensor disposed in the case and in communication with the controller, and a heating element disposed in the case and in communication with the controller.

10. The electric cycle as set forth in claim 9 further comprising an adjustable vent disposed at the air outlet for deflecting the air flow from the air outlet in a selected direction.

11. The electric cycle as set forth in claim 10 wherein the adjustable vent includes a frame and a vane pivotally connected to the frame for directing the air flow.

12. The electric cycle as set forth in claim 11 further comprising another vane pivotally connected to the frame transverse to the vane.

13. The electric cycle as set forth in claim 10 further comprising an additional air outlet in communication with the air inlet and facing the occupant region, and a baffle in communication with the additional air outlet for opening and closing the additional outlet.

14. The electric cycle as set forth in claim 9 wherein the air inlet faces away from the occupant region for intaking air as the electric cycle moves forward.

15. The electric cycle as set forth in claim 9 further comprising a heat sink in communication with the battery and an air passage extending from the air inlet to the air outlet and extending across the heat sink.

16. The electric cycle as set forth in claim 9 further comprising a fan disposed in the case for forcing air flow from the air inlet to the air outlet.

17. The electric cycle as set forth in claim 9 further comprising a motor and a controller disposed in the case programmed to control the motor.

18. The electric cycle as set forth in claim 9 wherein the controller is programmed to supply power from the battery to the heating element.

* * * * *